United States Patent
Bloom et al.

(10) Patent No.: US 8,387,040 B2
(45) Date of Patent: Feb. 26, 2013

(54) DYNAMIC CREATION OF CLIENT-SIDE ENVIRONMENT FOR PROBLEM ANALYSIS

(75) Inventors: Jennifer L. Bloom, Yarmouthport, MA (US); Denilson Nastacio, Apex, NC (US); Richard Trotter, Cary, NC (US); Michael L. Wamboldt, Garner, NC (US)

(73) Assignee: International Business Machines Corporation, Armonk, NY (US)

( * ) Notice: Subject to any disclaimer, the term of this patent is extended or adjusted under 35 U.S.C. 154(b) by 1435 days.

(21) Appl. No.: 12/019,158

(22) Filed: Jan. 24, 2008

(65) Prior Publication Data

US 2009/0193403 A1    Jul. 30, 2009

(51) Int. Cl.
*G06F 11/00* (2006.01)
(52) U.S. Cl. .................. 717/178; 717/124; 714/38.1
(58) Field of Classification Search .................. 717/178, 717/124; 714/38.1; 707/705
See application file for complete search history.

(56) References Cited

U.S. PATENT DOCUMENTS

| | | | |
|---|---|---|---|
| 5,787,253 A * | 7/1998 | McCreery et al. | 709/231 |
| 5,892,917 A * | 4/1999 | Myerson | 709/224 |
| 7,213,176 B2 * | 5/2007 | Banko | 714/38.12 |
| 2005/0033728 A1 * | 2/2005 | James et al. | 707/1 |
| 2005/0144526 A1 * | 6/2005 | Banko | 714/38 |
| 2005/0165929 A1 * | 7/2005 | Motoyama | 709/224 |
| 2007/0214240 A1 * | 9/2007 | Kalliola et al. | 709/219 |
| 2009/0144699 A1 * | 6/2009 | Fendt et al. | 717/120 |

* cited by examiner

*Primary Examiner* — Li B Zhen
*Assistant Examiner* — Joanne Macasiano
(74) *Attorney, Agent, or Firm* — Steven L. Nichols; Van Cott, Bagley, Cornwall & McCarthy P.C.

(57) ABSTRACT

The dynamic creation of a client-side environment for problem analysis includes the delivery and installation of a cohesive file structure to a client-side machine, the cohesive file structure including a data structure containing data files and an analyzer tool.

18 Claims, 6 Drawing Sheets

US 8,387,040 B2

DYNAMIC CREATION OF CLIENT-SIDE ENVIRONMENT FOR PROBLEM ANALYSIS

BACKGROUND OF THE INVENTION

Customers who obtain software and/or computer hardware from vendors often require assistance from the vendor to resolve problems that arise with the software or hardware. When a computer system encounters an unrecoverable error or other technical problem, the computer system may extract information relating to the technical problem and record this information in log or trace files. The information contained in the log or trace files can be helpful in determining the cause of the technical problem and in matching the technical problem to a potential solution.

The problem resolution cycle between the customers and vendors typically involves the submission of log files to a support specialist. The support specialist examines the log files in an attempt to pinpoint the symptoms that will lead to the identification of the problem or problems. It can take a significant amount of time to download/organize the log files, set up the problem solving environment, and screen the log files. Additionally, the problem solver typically must have access to specialized applications that aid in the triage of the log files.

BRIEF SUMMARY OF THE INVENTION

A method for the dynamic creation of a client-side environment for problem analysis includes submitting data files for analysis, creating a data structure containing the data files, generating a report containing information relevant to those data files and an embedded link, activating the embedded link so that an analyzer tool and the data structure are downloaded onto the client-side machine. A system for the creation of a client-side environment for problem analysis includes a computer useable program code that receives customer submitted files and generates a cohesive file structure containing the submitted files and an analyzer tool, the cohesive file structure being delivered and installed on a client-side machine.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION OF THE INVENTION

Figure 1:
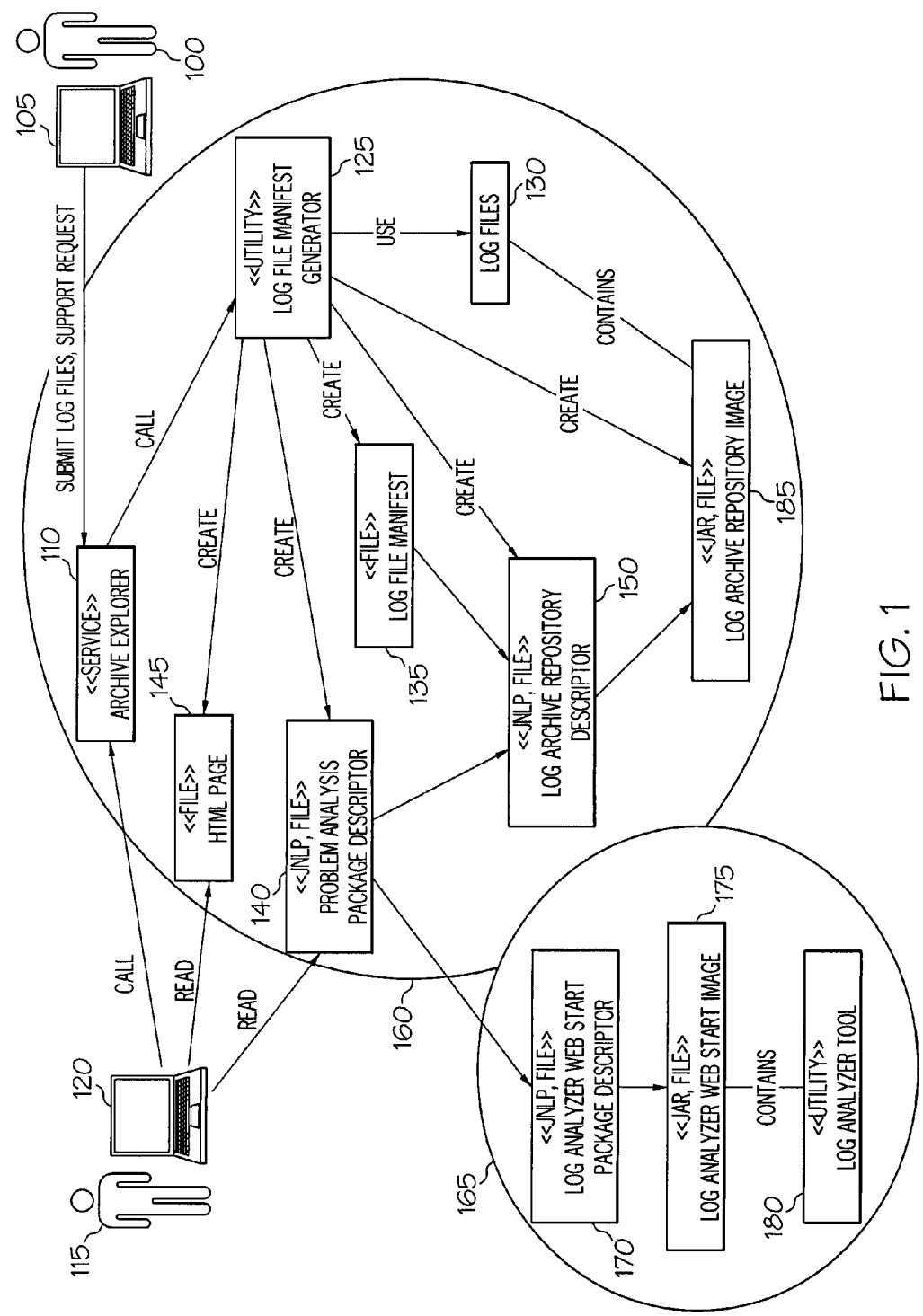
FIG. 1 is an illustrative diagram showing one exemplary embodiment of the system for the dynamic creation of a client-side environment for problem analysis.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The term "image," as used in this specification and appended claims, refers to a copy of a file or file structure transformed into a single data object. The term "descriptor" refers to a file that describes the content of a component or resource. A descriptor is often a defined data structure that is used to represent attribute types.

Customers and internal personnel who use software applications, computer hardware, and communication networks can experience technical problems that can be difficult to resolve alone. The customers may lack experience, support structure, current information, or adequate tools to resolve the problem. In many instances, support specialists are available through the vendor of the software or hardware product to resolve these technical issues. To analyze a technical issue, the support specialists may request information contained within log files generated by the computer system. A log file is a record of actions that occurred within a particular program or hardware system. Typically a log file is a text file consisting of timestamp, status, action descriptions, and error messages that detail the operational history of a given piece of software/hardware. Dozens or even hundreds of log files can be associated with a particular technical issue, with a typical log file for a file server having 20 Megabytes of information. During the problem resolution cycle, the interchange between customer and support specialist can involve the submission of multiple batches of log files for analysis.

The techniques and systems disclosed in this specification help support specialists to triage the received data and focus on the "hot spots" in the data by providing for the dynamic creation of a client-side environment for problem analysis. There are a variety of approaches to analyzing log files. In a first approach, a support specialist may download all files onto their local machine or machines and analyze the files there. However, it takes a significant amount of time and user interaction to set up the environment. Particularly where log files are large and numerous, triaging the log files can be a time-consuming process. In a second method, the support specialist can telnet into customer machines and analyze the files there. However, in this approach, each file has to be screened individually using tools available on the customer machines. Additionally, customers don't like sharing user/passwords from multiple machines with customer support. Some organizations may even have a company policy which prevents the sharing of usernames/passwords with outside entities. A third solution involves customers uploading log files to a central location where web-based tools are used to analyze the files. One problem with this approach can be hosting cost. Processing numerous, large log files can be a memory and resource intensive process. If the files are transposed into a database, using the web application to query the data upon user request can cause performance to suffer.

According to one exemplary embodiment of the present invention, a prepackaged contextual installation for client machines is provided that includes an array of analysis tools and all the relevant logs submitted by the customer. By pushing the whole environment onto the client-side computer, the support specialist or other technical individual can efficiently make decisions about the allocation of their local resources. Additionally, because all the tools and data reside on the client machine, the support specialist has better and quicker access to the relevant data.

FIG. 1 is an illustrative diagram showing one exemplary embodiment of the system for the dynamic creation of a client-side environment for problem analysis. FIG. 1 shows an overall picture of the system and introduces a portion of the elements within the system. The customer (100) utilizes a customer machine (105) to submit one or more log files and a support request to an archive explorer service (110) supported by a data server (160). A support specialist (115) utilizes a client machine (120) which calls the archive explorer service (110), which in turn calls a software utility designated as the log file manifest generator (125). Upon being activated, the log file manifest generator (125) uses the log files (130) to create various data files and representations of the data contained within the log files (130). By way of example and not limitation, the log file manifest generator (125) may use the log files (130) and other data to create, in no particular order, a problem analysis package descriptor (140), a log file manifest (135), a log archive repository descriptor (150), an HTML page (145), and a log archive repository image (185). The problem analysis package descriptor (140) residing on the data server (160) may also access files and executables contained on an application server (165). The application server (165) may contain a Java Web Start package descriptor (170), which may reference a Java Web Start image (175) which contains a log analyzer tool (180). The client-side machine (120) may also read the HTML page (145) and the problem analysis package descriptor (140), both of which reside on the data server (160). As described below, Java Web Start is a framework developed to allow application software to be started directly from the Internet using a web browser. Other technologies with the same or similar capability as Java Web Start could be used to implement the invention. By way of example and not limitation, the invention could be implemented using any technology that understands an application/data descriptor downloaded from a central location and can be used by a client-side application to download and launch an application locally.

Figure 2:
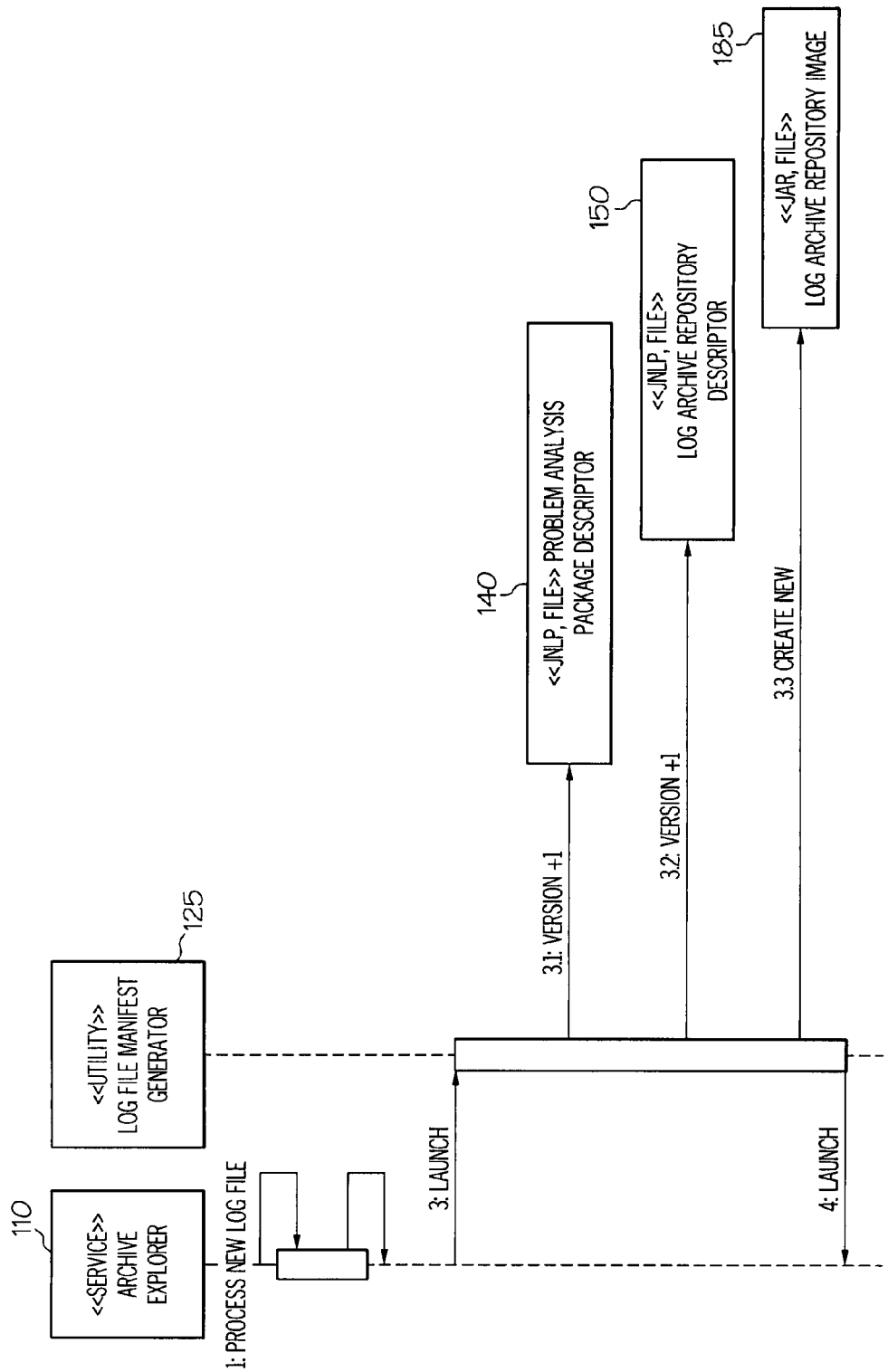
FIG. 2 is an illustrative diagram showing the actions by the data server upon the receipt of new log files from a customer.

FIG. 2 is an illustrative diagram showing the actions by the data server (160, FIG. 1) upon receipt of new log files from a customer (100, FIG. 1). The data server (160, FIG. 1) actions prepare for the later creation of a client-side environment. In FIG. 2, the vertical axis represents a temporal sequence of events, while various system components are placed along the horizontal axis. The action performed first is shown on the uppermost portion of the vertical axis with the next action being shown just below the first action, and so forth, with the final action being shown at the bottom of the vertical axis. The interaction between various components is shown by arrows extending between two components. In most instances, the arrows are labeled with a sequence number and a description of the action.

In a first action labeled "1: Process new log file," the archive explorer service (110) processes the new log files received from the customer (100, FIG. 1). Following the completion of the archive explorer's internal action, it launches the log file manifest generator (125) as shown by the arrow labeled "3: Launch." The log file manifest generator (125) creates a new problem analysis package descriptor (140) and gives the new problem analysis package descriptor (140) an incrementally larger version number. If the log files relate to a new problem for which log files have not been previously submitted, the initial version number is set to one. If the log files relate to a problem for which log files have already been received, the version number for the new problem analysis package descriptor (140) is the old version number plus one. This allows the system to distinguish a current problem analysis package descriptor from a previously generated descriptor. The problem analysis package descriptor (140) is a high-level description of the complete problem analysis package and contains links and information to each sub-component necessary for the client workstation to assemble the entire analyzer environment. For example, the problem analysis package descriptor (140) refers both to elements contained on the application server (165, FIG. 1) such as the Java Web Start package descriptor (170, FIG. 1) and elements contained on the data server (160, FIG. 1) such as the log archive repository descriptor (150).

Following the creation of the problem analysis package descriptor 140), the log manifest generator (125) creates a log archive repository descriptor (150). As was previously described, the version number is incremented by one for each new version of the log archive repository descriptor (150). The log archive repository descriptor (150) is a data descriptor which describes relevant information about the log files (130, FIG. 1) received from the customer (100, FIG. 1), the location of the log files, and the data structure in which they reside.

The log file manifest generator (125) also creates a log archive repository image (185) which contains all of newly submitted log files. According to one exemplary embodiment, the newly submitted log files are contained within a Java archive file (JAR). A JAR file is used for aggregating many files into a single file structure. In general, a JAR file is a compressed file archive structure which can be used to distribute Java classes and associated metadata. The submitted files may be in a variety of forms including XML files, Java server page files, or other file types. Following the creation of these files, the log manifest generator (125) turns operations back over to the archive explorer (110).

Figure 3:
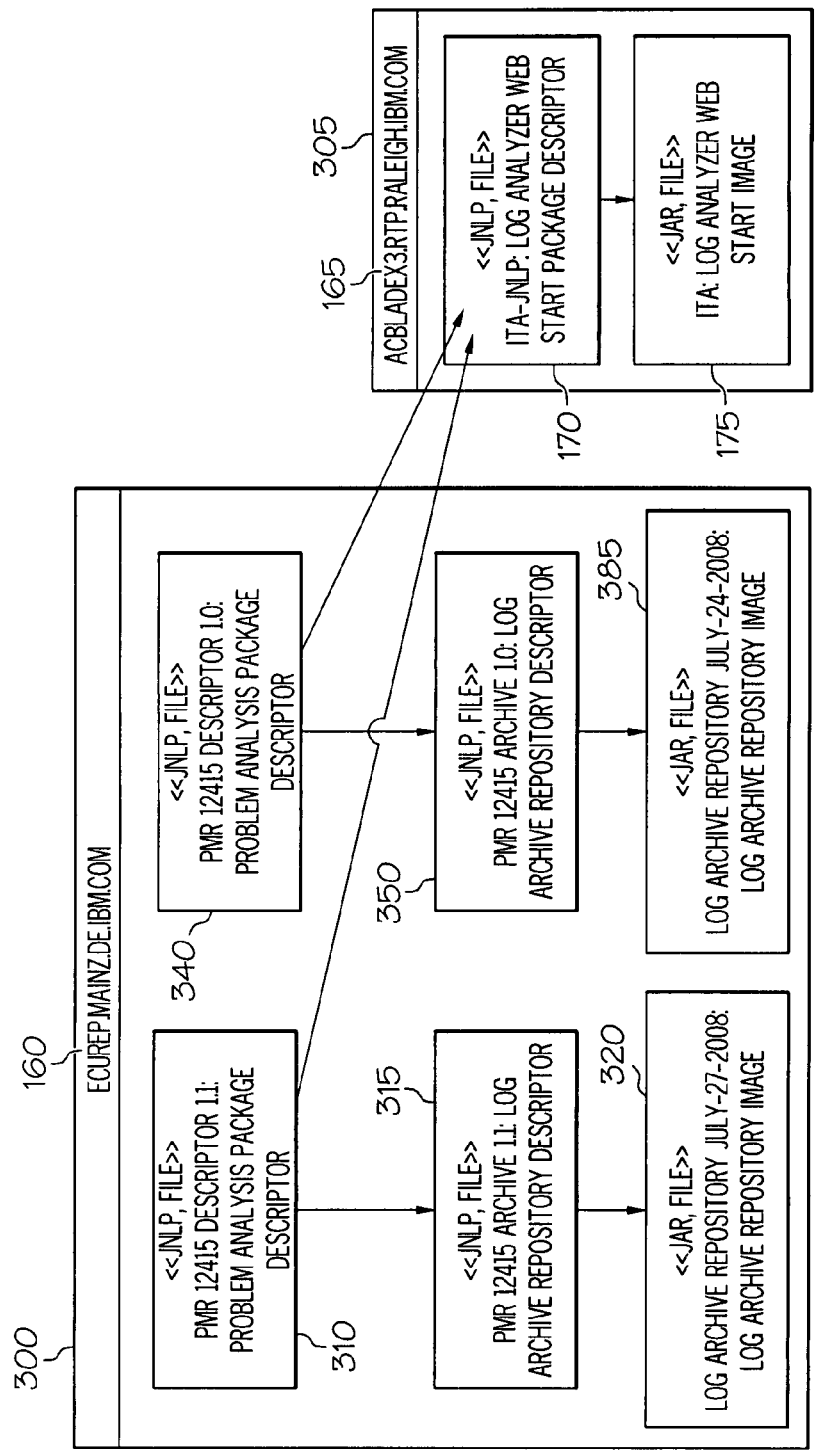
FIG. 3 is an illustrative diagram which shows a static model of various components of a client-side environment.

FIG. 3 is an illustrative diagram which shows a static model of files which could be contained on the data server (160) and the application server (165). In particular, FIG. 3 illustrates the update mechanism that utilizes version numbers to increase efficiency and minimize the amount of data downloaded during ongoing problem resolution cycles. A first window (300) represents one exemplary embodiment of the data server (160). In this example, the data server (160) is identified as "ecurep.mainz.de.ibm.com." The first window (300) shows a selection of files related to a specific problem that are contained in the data server (160). As was discussed with respect FIG. 2, the log file manifest generator generates a problem analysis package descriptor (340), log archive file descriptor (350), and a log archive repository image (385). In this example, the problem identifier "PMR 12415" has been assigned to the specific customer issue that is being analyzed. The problem identifier may be included in the file names that are generated in response to this specific customer issue and in descriptive text used to display or represent various files.

By way of example and not limitation, the named problem analysis package descriptor (340) includes the problem identifier and a version number.

In this example, the customer has submitted two sets of log files. In response to submission of the first set of log files, the log file manifest generator (125, FIG. 2) has generated the version "1.0" of problem analysis package descriptor (340), archive repository descriptor (350), and the log archive repository image with the creation date of Jul. 24, 2008 (385). As was discussed with reference to a previous figure, the problem analysis package descriptor (340) is a high-level description of the complete problem analysis package and contains links and information to the Java Web Start package descriptor (170) and the archive repository descriptor (350). The archive repository descriptor (350) is a description of the log archive repository image (385) which contains all the log files submitted by a customer at one specific time.

Additionally, a second window (305) represents an application server (165) and a selection of files specifically contained within that server. In this example, the server is identified as "acbladex3.rtp.raleigh.ibm.com." The application server (165) contains a Java Web Start package descriptor (170) and a Java Web Start image (175).

As the problem resolution cycle continued between the support specialist (115, FIG. 1) and the customer (100, FIG. 1), the customer (100, FIG. 1) submitted an additional batch of log files. These log files were received by the archive explorer (110, FIG. 2), which subsequently launched in the log file manifest generator (125, FIG. 2). The log file manifest generator (125, FIG. 2) then generated a new problem analysis package descriptor (310), a new archive repository descriptor (315), and a new log archive repository image (320). As can be seen in FIG. 3, the second group of files generated by the log manifest generator (125, FIG. 2) contains an identical problem identifier "PMR 12415" but has an incrementally larger version number "1.1." The log archive repository image (320) does not need either a problem identifier or version number because it is specifically referenced and accessed through the archive repository descriptor (315), which contains the information required to properly identify the correct log archive repository image (320, 385). The different versions of the log archive repository image (320, 385) are mutually exclusive files. The newest version (320) contains only those log files that were most recently submitted by the customer (100, FIG. 1). The version 1.1 problem analysis package descriptor (310) references the identical Java Web Start package descriptor (170) on the application server (165). This is because the same application tools or executable file can be used to analyze subsequent files and data. The version 1.1 files may also contain references to the earlier log archive repository image (385) or other files to give a complete picture of the technical issue.

Figure 4:
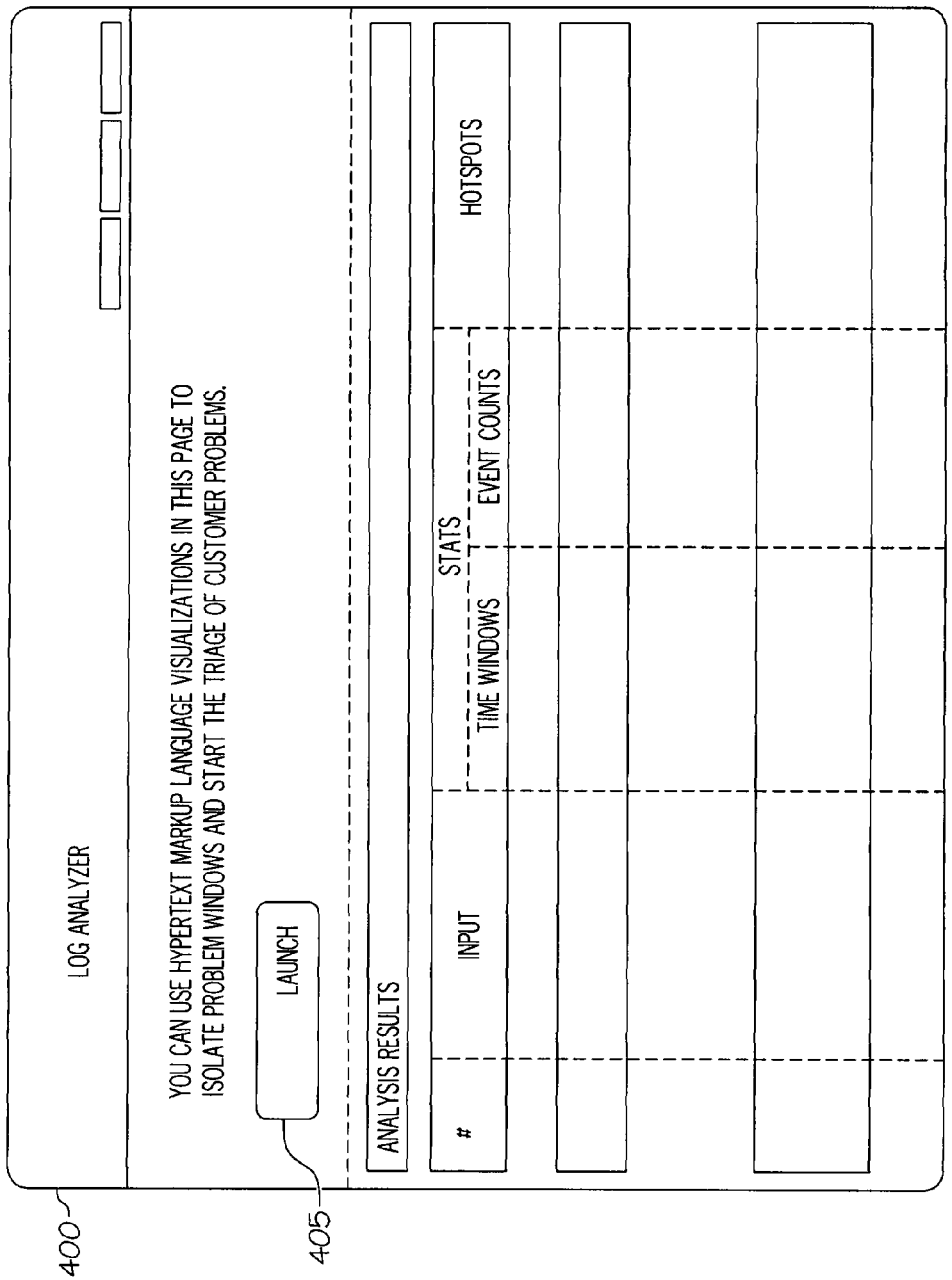
FIG. 4 is an illustrative diagram at shows one exemplary embodiment of a log analyzer webpage.

FIG. 4 is an illustrative diagram that shows one exemplary embodiment of a log analyzer webpage (400). According to this exemplary embodiment, the interaction between the support specialist (115, FIG. 1) and servers that upload the problem solving environment to the client machine (120, FIG. 1) begins when the support personnel (115, FIG. 1) clicks on a link or button (405) contained within the webpage (400). Clicking on the button (405) launches Java Web Start applications software. Java Web Start is a framework developed to allow application software to be started directly from the Internet using a web browser. As mentioned previously, the invention can also be implemented using other client-side technologies that have equivalent client-side download and launch capabilities. The Java Web Start application uses standard packaging descriptors that are contained within the Java Web Start code to execute actions described within the Java Web Start application. For example, these descriptors may include the location of code, what entry point should be used to access that code, and what command is needed to activate the code. According to one exemplary embodiment, the Java Web Start application is modified to describe dependencies between one component/executable and another component/library. For example, if a dependency is listed within an archive repository descriptor (315, 350; FIG. 3) that references a log archive repository image (320, 385; FIG. 3) then the Java Web Start application moves the log archive repository image (320, 385; FIG. 3) to the client machine. By doing this within the context of a single web session, the required credentials are passed to the relevant servers, thereby eliminating the need to repeatedly enter a username and password to access these resources.

The Java Network Launching Protocol (JNLP) is a closely related concept which is often used interchangeably with the term "Java Web Start". JNLP is a protocol defined in an XML file format that specifies how Java Web Start applications are launched. JNLP consists of a set of rules defining how exactly this launching mechanism should be implemented. JNLP files include information such as the location of a JAR package file and the name of the main class for the application, in addition to any other parameters for the program. With a properly configured browser, JNLP files are passed to a Java runtime environment, which in turn downloads the application onto the user's machine and starts executing it. Typically JNLP works on a classic client/server scheme. The JNLP client (which already resides on the client machine) reads and executes the JNLP file. The JNLP client runs locally on the client system but may access Web servers for data, some advanced features, or other assistance.

Figure 5:
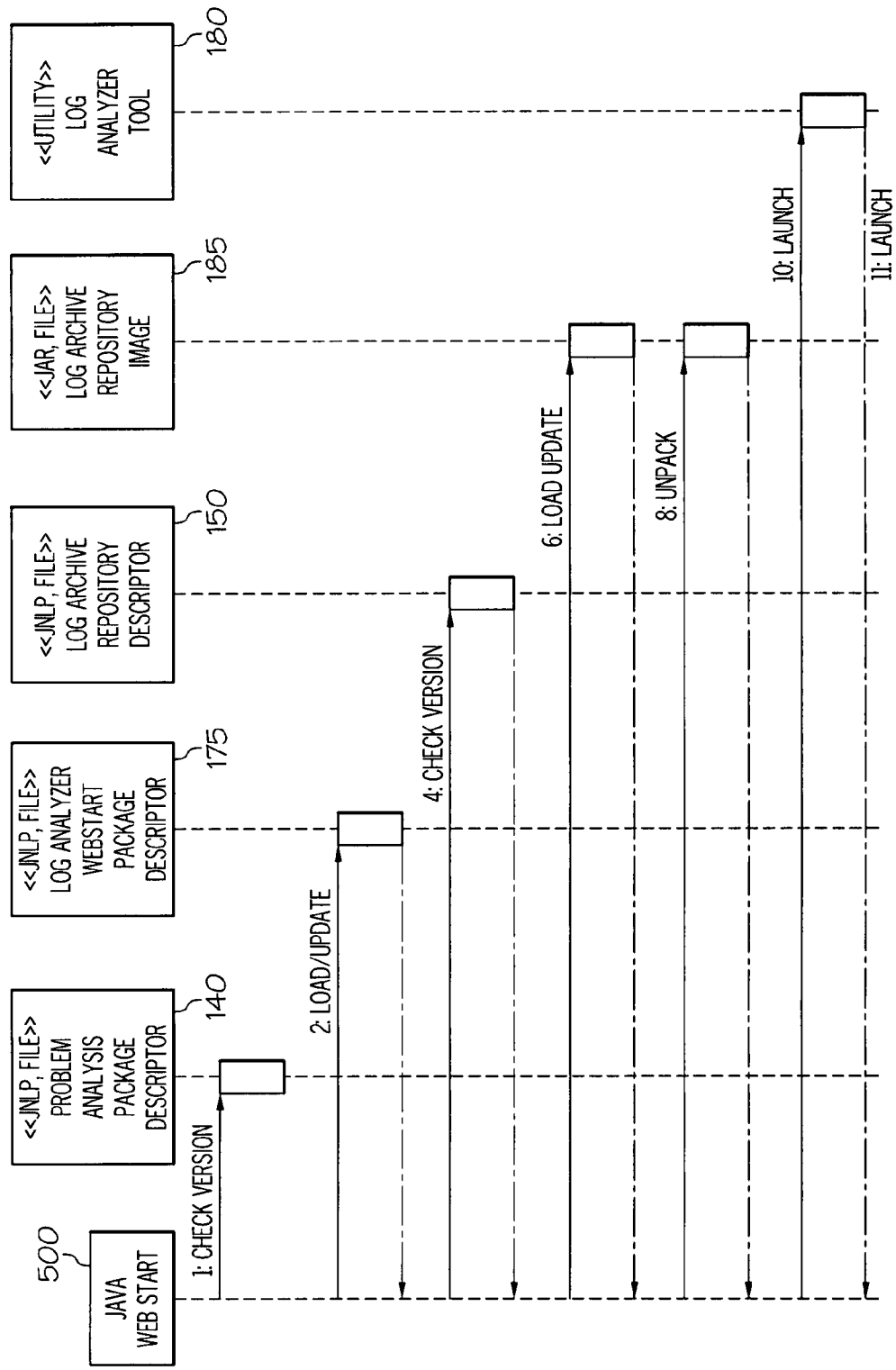
FIG. 5 is illustrative diagram showing a dynamic model of client-side operations following the initiation of the client-side environment.

FIG. 5 is an illustrative diagram showing a dynamic model of client-side operations. According to one exemplary embodiment, after the support specialist (115, FIG. 1) clicks on the button (405, FIG. 4), the JNLP client launches a Java Web Start application. As described in FIG. 2, the vertical axis represents a temporal sequence of events, while various system components are placed along the horizontal axis. The first action performed is shown on the uppermost portion of the vertical axis with the next action being shown just below the first action, and so forth, until the last action which is shown at the bottom of the vertical axis. The interaction between various components is shown by arrows that begin at a first vertical dashed line extending from the originating component and end at a second vertical dashed line extending from the target component. In most instances the arrows are labeled with a sequence number and a description of the action.

The first action of the Java Web Start application (500) is to check the version number of the problem analysis package descriptor (140). The Java Web Start application (500) creates and references a cache which contains the identifiers and version numbers of files that have already been downloaded, as well is the location of each of the downloaded files. If the Java Web Start application (500) determines that the current problem analysis descriptor (140) contains the same identifier and version number as a previously downloaded file, the Java Web Start application (500) will not download the problem analysis package descriptor (140). However, if the identifier or the version number is different than that of any file the Java Web Start application has previously downloaded, it will download or update the new Java Web Start package descriptor (175) as shown by the arrow labeled "2: load/update." Similarly, the Java Web Start application (500) checks the log archive repository descriptor (150) to determine if the log archive repository descriptor (185) has been previously download. If the particular version of the repository descriptor (150) has not been downloaded, the Java Web Start application (500) downloads or updates the log archive repository image (185) as illustrated by the arrow labeled "6: load/update." As described previously, the repository image contains all the log file data submitted by the customer (100, FIG. 1) at a single time.

By way of example and not limitation, the problem analysis package descriptor (340, FIG. 3) described in FIG. 3 would direct the Java Web Start application (500) to download the log archive repository descriptor (350, FIG. 3) labeled "PMR 12415 Archive 1.0: Log Archive Repository Descriptor.". Following the submission of additional log files by the customer (100, FIG. 1), a later version of the log archive repository descriptor (315) labeled "PMR 12415 Archive 1.1: Log Archive Repository Descriptor" is created by the log file manifest generator (125, FIG. 2). When the Java Web Start application (500) checks the problem analysis package descriptor (310, FIG. 3), it will determine that the referenced log archive of the repository descriptor (315, FIG. 3) has an identical problem identifier, but a different version number. The Java Web Start application will then download the newer version of the log archive repository descriptor (315, FIG. 3).

Similarly, the Java Web Start application (500) downloads the latest version of the log archive repository image (185). As described above, different versions of the log archive repository image (320, 385; FIG. 3) are mutually exclusive files. The newest version contains only those log files that were most recently submitted by the customer (100, FIG. 1). By loading only those files that are new, significant savings in time, disk space, and network traffic can be realized. In many cases, the log archive repository files can be very large. For example, a typical Web Sphere server log file contains about 20 MB. There can be dozens or even hundreds of log files associated with a particular problem which can lead to JAR file sizes on the order of 1 GB or greater. After downloading the latest version of the log archive repository image (185), the Java Web Start application (500) then unpacks the JAR file and other data. According to one exemplary embodiment, the Java Web Start (500) application invokes a launch/bootstrap class that executes the unpacking and launching steps described in FIG. 5.

Figure 6:
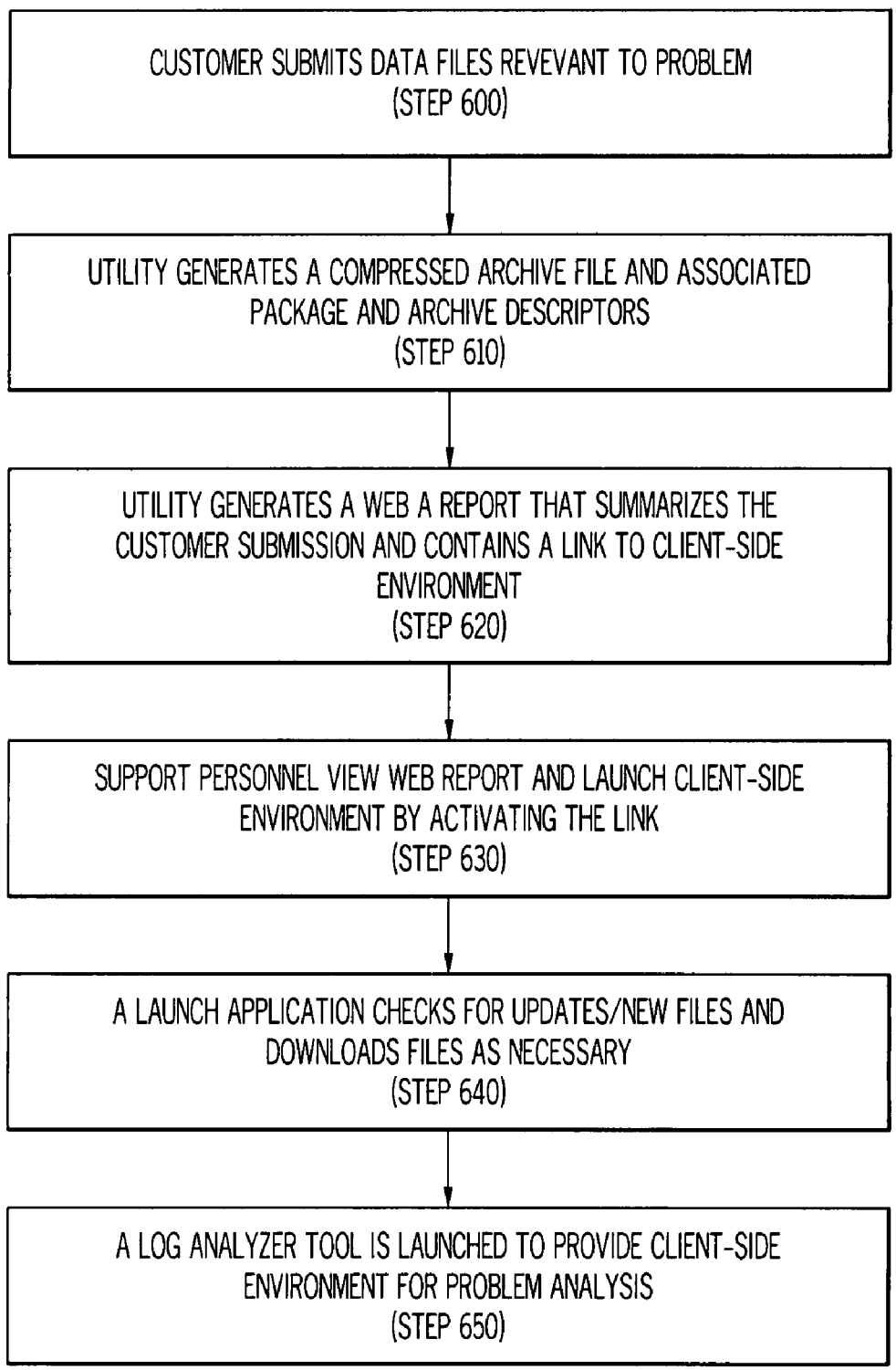
FIG. 6 is an illustrative flowchart describing one exemplary method for creating a client-side environment for problem analysis.

FIG. 6 is an illustrative flowchart describing one exemplary method for creating a client-side environment for problem analysis. According to one exemplary embodiment, the customer submits data files relevant to the problem (step 600). In response to the customer submission of data files, a utility generates a compressed archive file and associated packaging and archive descriptors (step 610). The package descriptor contains information regarding, and the location of, high-level components that comprise the client-side environment for problem analysis. For example, the package descriptor may reference the archive descriptor, which in turn contains information about the location and the data structure of the compressed archive file. The utility then generates a report that summarizes the customer submission and contains a link that launches the client-side environment (step 610). By way of example and not limitation, this report could be a webpage or HTML page that is available to support personnel through a client workstation. Support personnel view the report and launch the client-side environment by activating an embedded link contained within the report (step 630). A launch application checks for updates or new files and downloads files as necessary from a data server and/or from an application server (step 640). A log analyzer tool is then launched to provide the client-side environment for problem analysis (step 650). In one exemplary embodiment, the troubleshooting environment is customized to allow for easy use. By way of example and not limitation, the troubleshooting environment could organize particular files or applications such that the most relevant were visible following the launch. Additionally, the cursor could be placed on a certain line within the log files or various portions of report or log files could be highlighted.

In sum, the dynamic creation of a client-side environment for problem analysis provides significant advantages during problem resolution. A web based application allows clients to more easily submit log files. By packaging the troubleshooting tools along with the relevant log files, a complete client-side environment for problem analysis can be delivered in response to a click on an embedded link contained within a webpage. Anyone with a web browser can access and install on a client machine all the applications and analysis tools, as well as the relevant log files. This will allow support personnel from around the globe to access the customer data files, analyze the problem, and provide a solution. This could be a particularly effective method of allowing a first support person to quickly identify the general area of the problem and then pass the relevant problem solving environment to a highly specialized technician for more rapid resolution of the problem. Customers can also access the client-side troubleshooting environment and attempt to solve problems within their own system prior to requesting assistance from support personnel. The system also provides a simple method for updating the environment with the new log files, additional tools, patches, and other updates.

Flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A computer program product for dynamic creation of a client-side environment for problem analysis, the computer program product comprising:
   a computer usable memory device having computer usable program code embodied therewith, the computer usable program code comprising:
   computer usable program code configured to receive and manipulate customer submitted files, said submitted files being relevant to an issue within a customer computer system;
   computer usable program code configured to package analyzer tools and data contained within said submitted files into a cohesive file structure, said cohesive file structure being configured to create an environment for problem analysis; and
   computer usable program code configured to deliver and install said cohesive file structure on a client-side machine;
   wherein said cohesive file structure comprises a package descriptor, said package descriptor referencing a data descriptor and an application descriptor; and
   wherein said application descriptor comprises a Java Web Start image, said Java Web Start image containing a log analyzer utility.

2. The computer program product of claim 1, wherein said computer usable program code configured to receive and manipulate said customer submitted files further comprises a web based interface through which a customer can submit said customer submitted files.

3. The computer program product of claim 2, wherein said computer useable program code configured to receive and manipulate said customer submitted files further comprises a software utility configured to create a first data descriptor and a first data structure; said first data structure containing said customer submitted files; and said first data descriptor referencing said first data structure and having a first version number.

4. The computer program product of claim 3, wherein said software utility is further configured to generate a second data descriptor and a second data structure in response to a receipt of a subsequent batch of said customer submitted files related to said issue; said second data descriptor having a second version number.

5. The computer program product of claim 4, wherein said first data structure and said second data structure further comprise a Java Archive file.

6. The computer program product of claim 4, wherein said first data structure and said second data structure contain mutually exclusive customer submitted data.

7. The computer program product of claim 1, wherein said data descriptor comprises a reference to a data structure; said data structure containing said customer submitted files.

8. The computer program product of claim 1, wherein said computer usable program code configured to deliver and install said cohesive file structure to said client-side machine comprises an embedded link within a web page; said embedded link activating an executable code, said executable code being configured to act upon information contained within said package descriptor.

9. The computer program product of claim 8, wherein said executable code checks version numbers of one or more of said package descriptor, said data descriptor, or said application descriptor.

10. The computer program product of claim 9, wherein said executable code is further configured to download to said client-side machine any dependent files referenced by said package descriptor, said data descriptor and said application descriptor.

11. The computer program product of claim 10, wherein said executable code maintains a cache; said cache containing identifiers of previously downloaded files; said executable code being configured to download to said client-side machine versions or updates to files referenced by said package descriptor or its subcomponents if said files referenced by said package descriptor or its subcomponents have not been previously downloaded.

12. The computer program product of claim 10, wherein said dependent files comprise a data structure containing said customer submitted files and a log analyzer utility.

13. The computer program product of claim 10, wherein said executable code comprises Java Web Start code, said Java Web Start code being further configured to launch said log analyzer utility on said client-side machine, said log analyzer utility being configured to analyze said customer submitted files.

14. A computer program product for dynamic creation of a client-side environment for problem analysis, the computer program product comprising:
    a computer usable memory device having computer usable program code embodied therewith, the computer usable program code comprising:
    computer usable program code configured to receive customer submitted files through a web based interface, said customer submitted files being relevant to an issue within a computer system;
    computer usable program code configured to create a data descriptor and a data structure corresponding to said customer submitted files, said data descriptor referencing said data structure, said data structure comprising an archive containing said customer submitted files;
    computer usable program code configured create a package descriptor, said package descriptor referencing said data descriptor and an application descriptor corresponding to a log analyzer utility, wherein said application descriptor comprises a Java Web Start image, said Java Web Start image containing said log analyzer utility; and
    computer usable program code configured to download said package descriptor to a client-side environment so that said client-side environment has data to install said log analyzer utility and said data structure, said log analyzer utility being configure to create a client-side environment to analyze said data structure.

15. A method for dynamic creation of a client-side environment for problem analysis comprising:
    receiving data files relevant to a technical issue within software, hardware, or a computer system;
    generating a data structure containing data from said data files and an analyzer tool, said data structure being configured to create an environment for problem analysis;
    generating a report; said report comprising information relevant to said data files and an embedded link, said embedded link referencing executable code, said executable code being configured to download said data structure;
    activating said embedded link such that said executable code downloads said data structure to a client-side machine; said executable code being further configured to launch said analyzer tool on said client-side machine; said analyzer tool referencing said data structure to provide a client-side environment for problem analysis;
    wherein said data structure comprises an application descriptor; and
    wherein said application descriptor comprises a Java Web Start image, said Java Web Start image containing a log analyzer utility.

16. The method of claim 15, further comprising checking for updates or new versions of said data structure or said analyzer tool.

17. The method of claim 16, wherein said client-side environment for problem analysis can be accessed through a web browser.

18. The method of claim 17, wherein said report comprises a web page, said web page containing said embedded link, said embedded link activating said Java Web Start image.

* * * * *